(12) United States Patent
Post et al.

(10) Patent No.: US 11,018,565 B2
(45) Date of Patent: May 25, 2021

(54) AXIAL FLUX ELECTRIC MACHINE AND METHODS OF ASSEMBLING THE SAME

(71) Applicants: REGAL BELOIT AMERICA, INC., Beloit, WI (US); REGAL BELOIT AUSTRALIA PTY LTD, Rowville (AU)

(72) Inventors: Steve Wilfred Post, Cassville, MO (US); Greg Heins, Rowville (AU); Jason Jon Kreidler, Sheboygan, WI (US)

(73) Assignees: REGAL BELOIT AMERICA, INC., Beloit, WI (US); REGAL BELOIT AUSTRALIA PTY LTD., Rowville (AU)

( * ) Notice: Subject to any disclaimer, the term of this patent is extended or adjusted under 35 U.S.C. 154(b) by 154 days.

(21) Appl. No.: 15/980,193

(22) Filed: May 15, 2018

(65) Prior Publication Data
US 2019/0356194 A1    Nov. 21, 2019

(51) Int. Cl.
| | |
|---|---|
| *H02K 1/18* | (2006.01) |
| *H02K 3/32* | (2006.01) |
| *H02K 7/14* | (2006.01) |
| *H02K 1/08* | (2006.01) |
| *H02K 21/24* | (2006.01) |

(Continued)

(52) U.S. Cl.
CPC ............. *H02K 21/24* (2013.01); *F04D 17/16* (2013.01); *F04D 25/06* (2013.01); *F04D 29/4226* (2013.01); *H02K 1/143* (2013.01); *H02K 1/182* (2013.01); *H02K 1/2793* (2013.01); *H02K 3/325* (2013.01); *H02K 5/24* (2013.01); *H02K 7/14* (2013.01); *H02K 15/022* (2013.01); *H02K 15/14* (2013.01); *H02K 29/03* (2013.01); *H02K 2203/12* (2013.01)

(58) Field of Classification Search
CPC .... H02K 1/143; H02K 1/1793; H02K 1/2793; H02K 21/24; H02K 5/24; H02K 3/325; H02K 1/182; H02K 7/14; H02K 15/022; H02K 15/14; H02K 29/03; H02K 2203/12; H01F 3/00; H01F 3/02; H01F 3/04; F24D 25/06; F24D 25/0646
USPC ........ 310/156.32–156.37, 216.001, 216.004, 310/216.015, 216.023, 216.088, 268; 335/297
See application file for complete search history.

(56) References Cited

U.S. PATENT DOCUMENTS

| | | | | |
|---|---|---|---|---|
| 4,912,353 | A | * | 3/1990 | Kondo ................... H02K 1/148 310/216.067 |
| 5,982,070 | A | * | 11/1999 | Caamano ................. H02K 1/02 29/596 |

(Continued)

FOREIGN PATENT DOCUMENTS

| | | |
|---|---|---|
| CN | 103855900 A | 6/2014 |
| CN | 103997145 B | 8/2016 |
| CN | 103956841 B | 9/2017 |

*Primary Examiner* — Burton S Mullins
(74) *Attorney, Agent, or Firm* — Armstrong Teasdale LLP (57) ABSTRACT

A stator assembly for use in an axial flux electric motor includes at least one tooth tip and at least one stator tooth coupled to the at least one tooth tip, wherein the at least one stator tooth includes an insertable portion. The stator assembly also includes at least one stator base including at least one receiving slot configured to receive the insertable portion to form a mechanical joint between the at least one stator base and the at least one stator tooth.

16 Claims, 11 Drawing Sheets

(51) Int. Cl.
*H02K 5/24* (2006.01)
*H02K 1/14* (2006.01)
*H02K 1/27* (2006.01)
*H02K 15/02* (2006.01)
*H02K 15/14* (2006.01)
*F04D 17/16* (2006.01)
*F04D 25/06* (2006.01)
*F04D 29/42* (2006.01)
*H02K 29/03* (2006.01)

(56) References Cited

U.S. PATENT DOCUMENTS

| | | | | |
|---|---|---|---|---|
| 6,188,159 B1 * | 2/2001 | Fan | ............ | H02K 1/141 |
| | | | | 310/216.026 |
| 7,173,357 B2 * | 2/2007 | Naito | ............ | H02K 1/148 |
| | | | | 310/154.05 |
| 7,642,686 B2 * | 1/2010 | Naitou | ............ | H02K 1/148 |
| | | | | 310/216.058 |
| 7,821,169 B2 * | 10/2010 | Okazaki | ............ | H02K 21/24 |
| | | | | 310/156.36 |
| 7,906,886 B2 * | 3/2011 | Jang | ............ | H02K 1/148 |
| | | | | 310/216.133 |
| 8,354,768 B2 * | 1/2013 | Cipriani | ............ | H02K 21/24 |
| | | | | 310/209 |
| 9,013,086 B2 * | 4/2015 | Dokonal | ............ | H02K 1/148 |
| | | | | 310/216.009 |
| 2003/0057796 A1 * | 3/2003 | Fan | ............ | H02K 1/148 |
| | | | | 310/216.062 |
| 2006/0103263 A1 * | 5/2006 | Naito | ............ | H02K 3/522 |
| | | | | 310/268 |
| 2010/0225195 A1 * | 9/2010 | Asano | ............ | F04B 39/00 |
| | | | | 310/216.067 |
| 2012/0235530 A1 * | 9/2012 | Moya | ............ | H02K 1/148 |
| | | | | 310/156.01 |
| 2014/0265653 A1 * | 9/2014 | Heins | ............ | H02K 21/24 |
| | | | | 310/51 |
| 2015/0084477 A1 * | 3/2015 | Turner | ............ | H02K 1/182 |
| | | | | 310/216.113 |

* cited by examiner

AXIAL FLUX ELECTRIC MACHINE AND METHODS OF ASSEMBLING THE SAME

BACKGROUND OF THE INVENTION

The field of the invention relates generally to electrical machines, and more particularly, to axial flux electric motors having a modular stator.

One of many applications for an electric motor is to operate a pump or a blower. The electric motor may be configured to rotate an impeller within a pump or blower, which displaces a fluid, causing a fluid flow. Many gas burning appliances include an electric motor, for example, water heaters, boilers, pool heaters, space heaters, furnaces, and radiant heaters. In some examples, the electric motor powers a blower that moves air or a fuel/air mixture through the appliance. In other examples, the electric motor powers a blower that distributes air output from the appliance.

At least some known axial flux electric motors include a stator core having a plurality of stator teeth. A bobbin with a winding is situated around every other tooth and a magnet of the rotor assembly is positioned above the stator teeth. In operation of such motor configurations, the magnetic flux transition between adjacent stator teeth is aggressive because of the lack of tooth tips on the stator teeth to dissipate the flux. The lack of tooth tips causes an increase in undesirable noise generation and also encourages undesirable bearing currents.

In some known axial flux electric motors, partial stator teeth with attached tooth tips are attached to U-shaped stator members and the stator core, bobbins, and windings are over-molded with a resin to secure the stator components together. However, over-molding the stator increases the motor manufacturing and labor costs and also limits the power produced by the motor because of heat built up within the over-molded stator.

BRIEF DESCRIPTION OF THE INVENTION

In one aspect, a stator assembly for use in an axial flux electric motor is provided. The stator assembly includes at least one tooth tip and at least one stator tooth coupled to the at least one tooth tip, wherein the at least one stator tooth includes an insertable portion. The stator assembly also includes at least one stator base including at least one receiving slot configured to receive the insertable portion to form a mechanical joint between the at least one stator base and the at least one stator tooth.

In another aspect, an axial flux electric motor is provided. The axial flux electric motor includes a rotor assembly and a stator assembly coupled to the rotor assembly to define an axial gap therebetween. The stator assembly includes at least one tooth assembly including a tip portion and a tooth portion integrally formed with the tip portion, wherein the tooth portion comprises an insertable portion. The stator assembly also includes at least one stator base including at least one receiving slot configured to receive the insertable portion to form a mechanical joint between the at least one stator base and the at least one tooth assembly.

In yet another aspect, a method of assembling an axial flux electric motor is provided. The method includes coupling at least one stator base to a motor frame, wherein the at least one stator base includes at least one receiving slot. The method also includes coupling a tooth tip to a stator tooth, wherein the stator tooth includes an insertable portion, and inserting the insertable portion of the stator tooth into the at least one receiving slot of the stator base to form a mechanical joint.

DETAILED DESCRIPTION OF THE INVENTION

Figure 1:
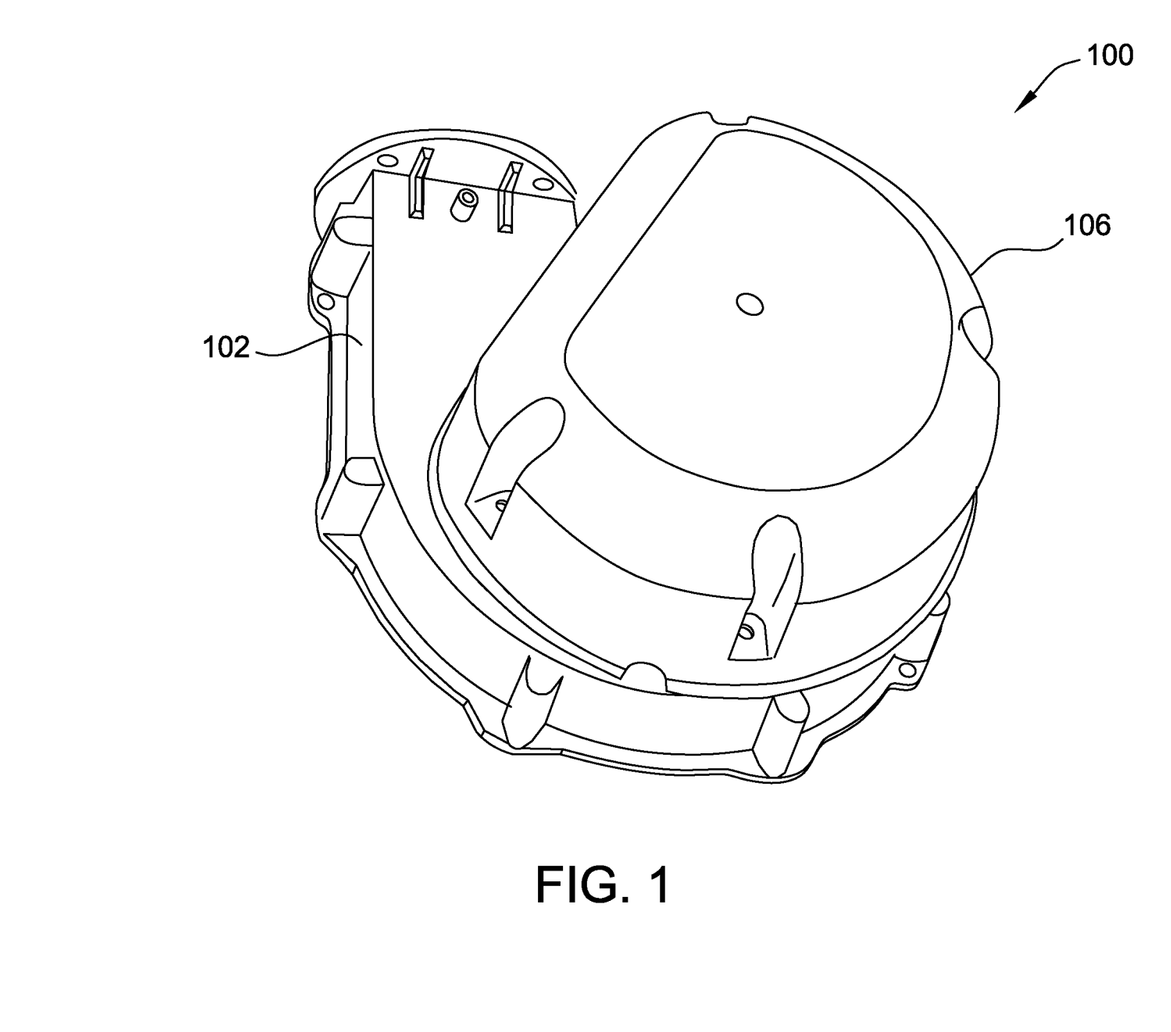
FIG. 1 is a perspective view of an exemplary blower assembly.
Figure 2:
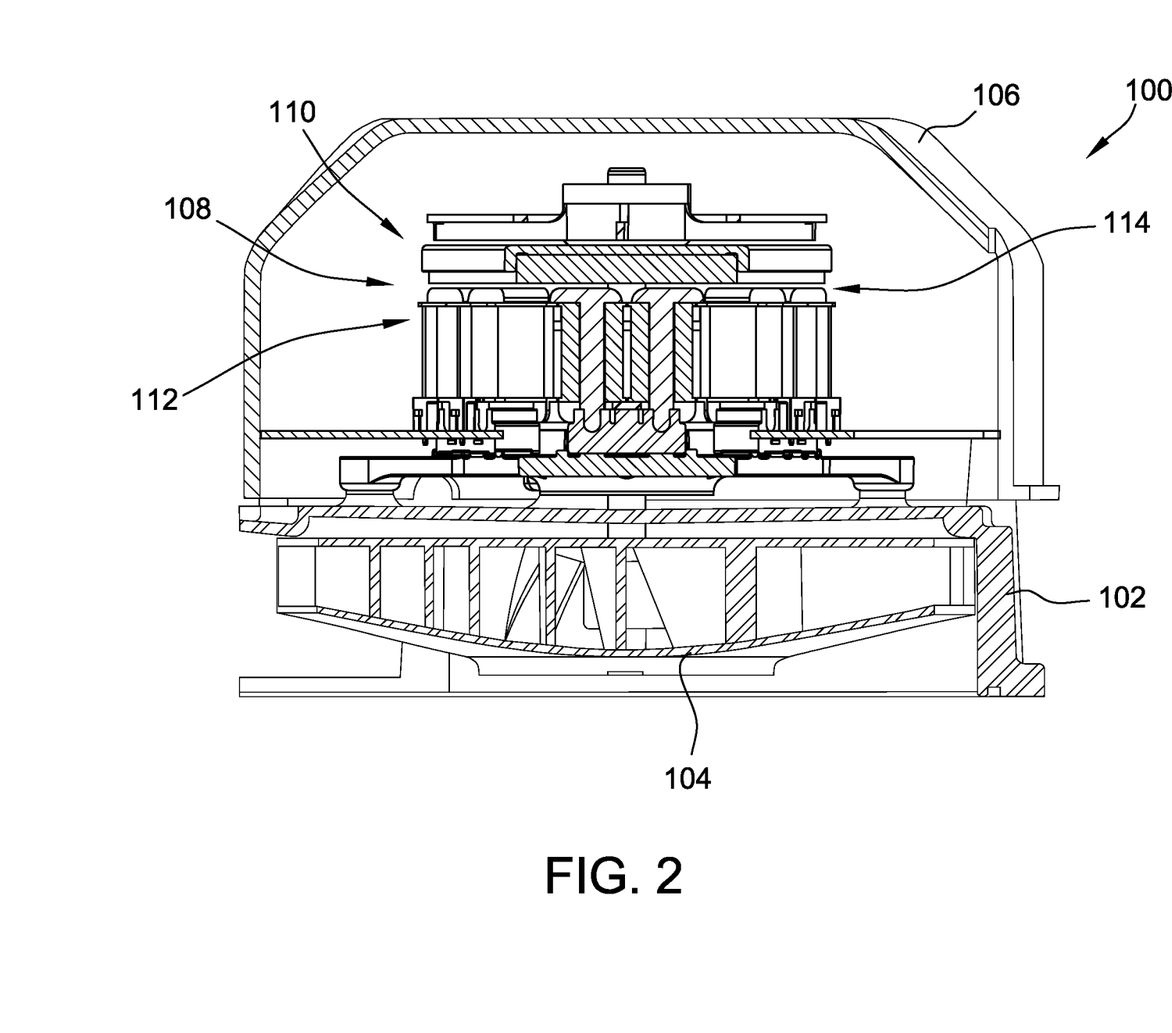
FIG. 2 is a cross-sectional view of the blower assembly shown in FIG. 1.
Figure 3:
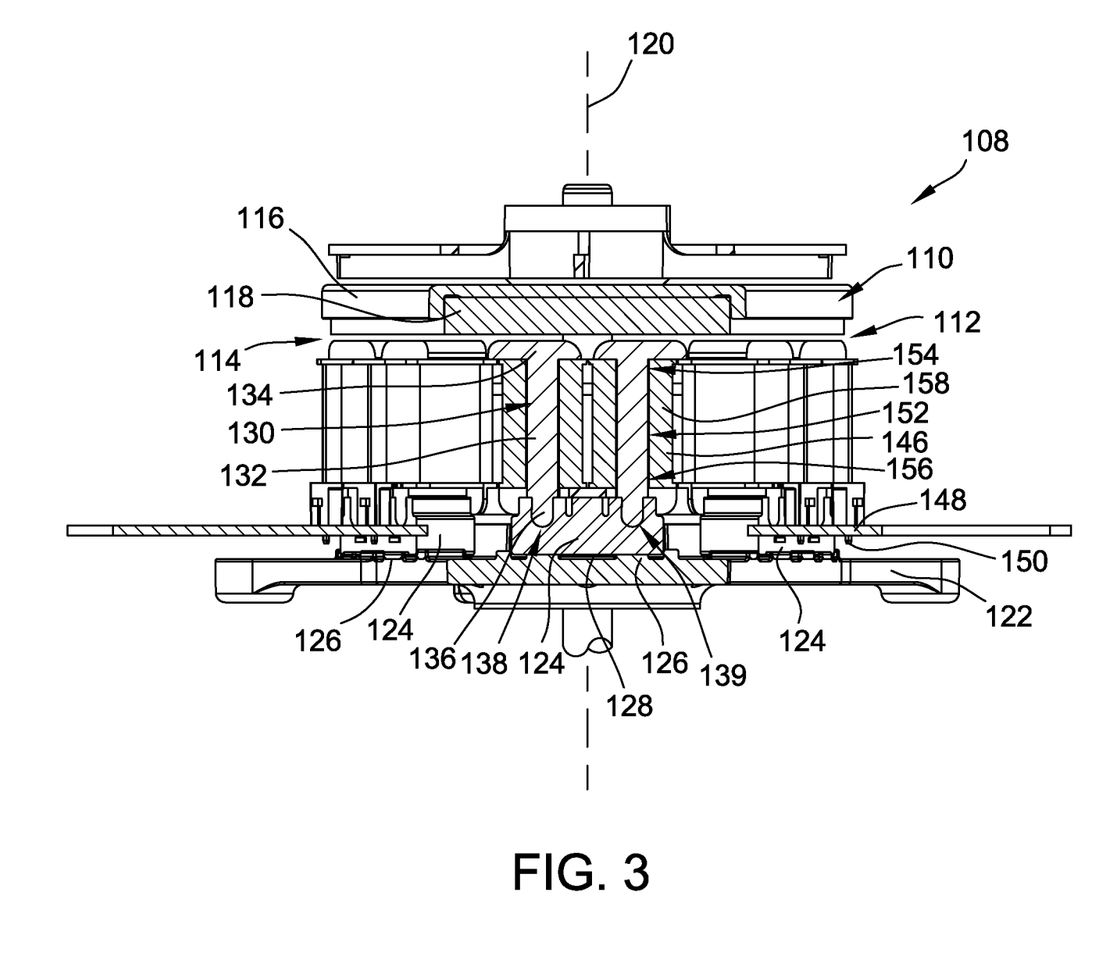
FIG. 3 is an enlarged view of the blower assembly shown in FIG. 2 illustrating an exemplary stator assembly.

FIG. 1 is a perspective view of an exemplary blower assembly 100. FIG. 2 is a cross-sectional view of blower assembly 100. FIG. 3 is an enlarged view of blower assembly 100 illustrating an exemplary stator assembly. In the exemplary embodiment, blower assembly 100 includes a blower housing 102 that at least partially encases an impeller 104. A motor casing 106 is coupled to blower housing 102 and encases a motor 108, which is coupled to impeller 104 via an opening in blower housing 102.

In the exemplary embodiment, motor 108 is an axial flux electric motor including a rotor assembly 110 and a stator assembly 112 coupled to rotor assembly 110 to define an axial gap 114 therebetween. Rotor assembly 110 generally includes a rotor 116 and at least one permanent magnet 118 coupled to rotor 116. In the exemplary embodiment, permanent magnet 118 is fabricated from ferrite and is formed as single disc having a plurality of poles. Alternatively, permanent magnet 118 includes a plurality of magnet segments coupled to rotor 116. Generally, any suitable permanent magnet shape, segment count, and material may be used that enables motor 108 to function as described herein. Rotor assembly 110 is rotatable within motor casing 106 about an axis of rotation 120. In the exemplary embodiment, rotor assembly 110 is driven by an electronic control (not shown), for example, a sinusoidal or trapezoidal electronic control. In the exemplary embodiment, rotor 116 is machined and/or cast from any suitable material, for example, steel.

Figure 7:
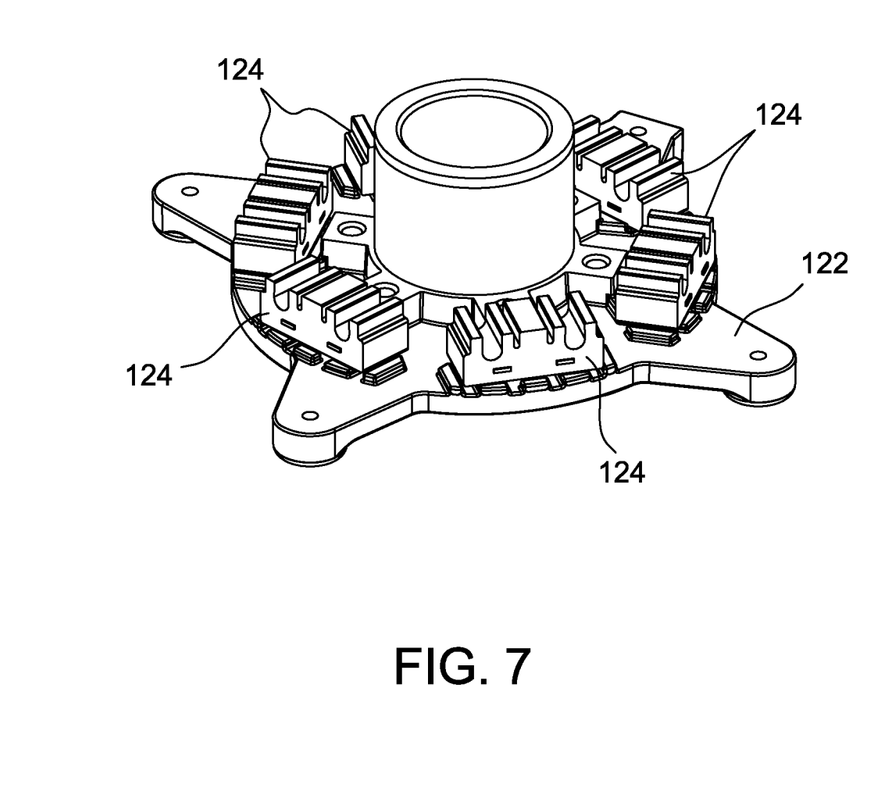
FIG. 7 is a perspective view of a partially assembled stator assembly shown in FIG. 3 illustrating a plurality of stator bases shown in FIG. 5 coupled to the motor frame shown in FIG. 6.
Figure 11:
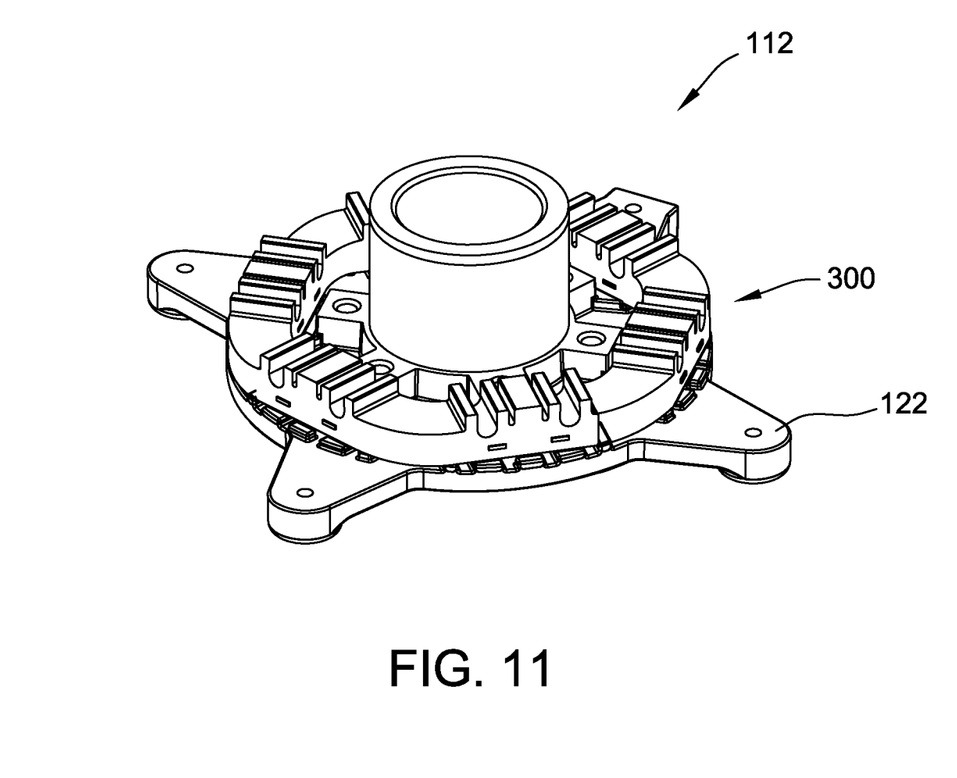
FIG. 11 is perspective view of a partially assembled alternative stator assembly illustrating a ring-shaped stator base coupled to the motor frame shown in FIG. 6.

Stator assembly 112 is a multi-phase (more than one phase) axial flux stator, and is preferably a three-phase axial flux stator producing flux in the axial direction (i.e., parallel to axis of rotation 120). Stator assembly 112 includes a motor frame 122 coupled to blower housing 102 and at least one stator base 124 coupled to motor frame 122. As shown in FIG. 7, in one embodiment, stator assembly 112 includes a plurality of circumferentially-spaced stator bases 124 coupled to motor frame 122. More specifically, motor frame 122 includes a plurality of frame mounting mechanisms 126 that couple with a plurality of corresponding base mounting mechanisms 128 formed on each stator base 124. In an alternative embodiment, as shown in FIG. 11, stator assembly 112 includes a single, ring-shaped stator base 300 coupled to motor frame 122. Stator assembly 112 also includes a plurality of tooth assemblies 130 that each include a stator tooth 132 coupled to a tooth tip 134.

Figure 4:
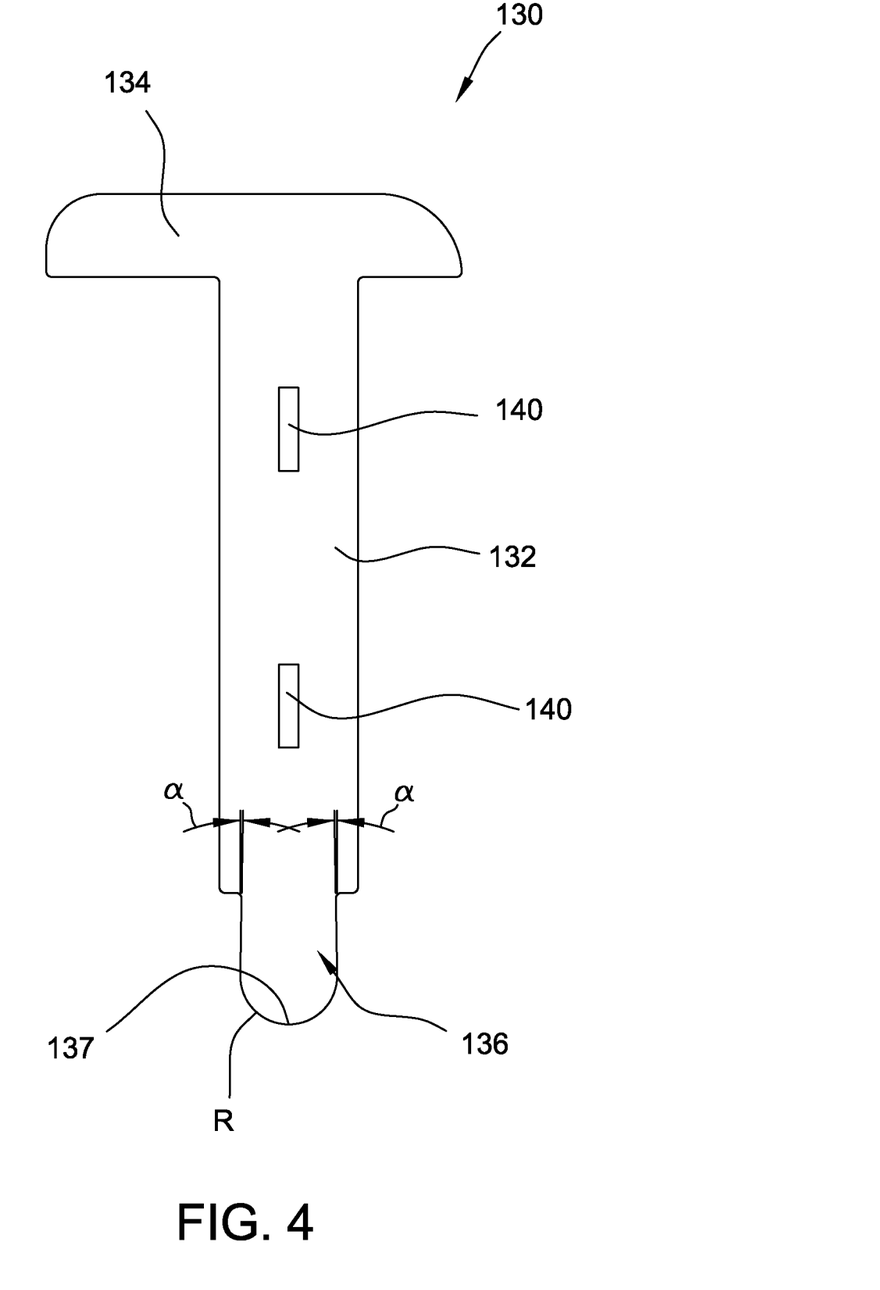
FIG. 4 is a front view of an exemplary tooth assembly for use in the stator assembly shown in FIG. 3.
Figure 5:
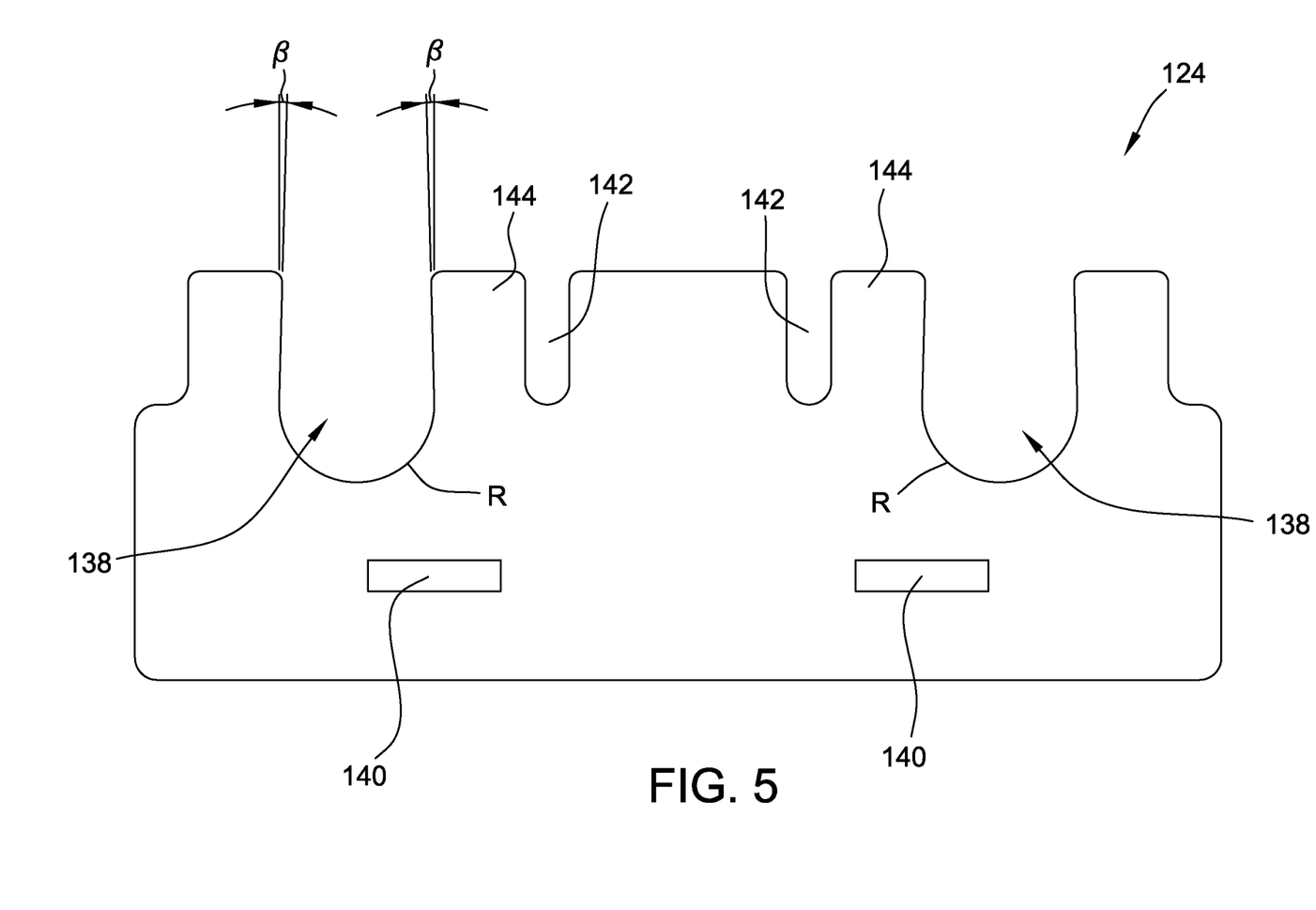
FIG. 5 is a front view of an exemplary stator base for use in the stator assembly shown in FIG. 3.
Figure 6:
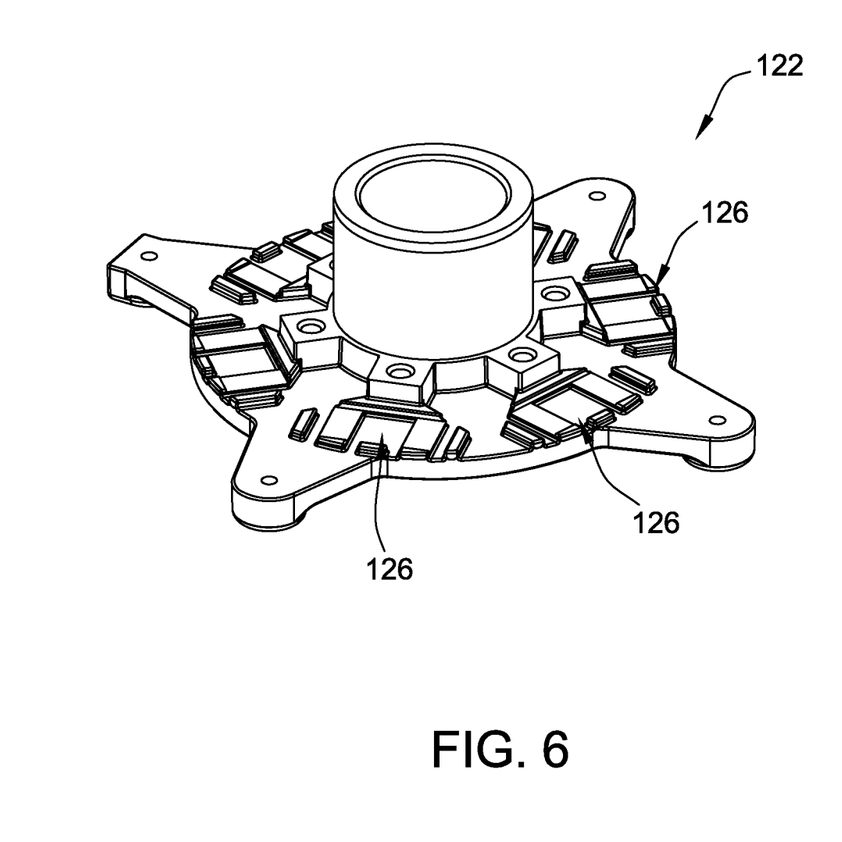
FIG. 6 is a perspective view of an exemplary motor frame for use in the stator assembly shown in FIG. 3.

In the exemplary embodiment, each stator tooth 132 includes an insertable portion 136 and each stator base 124 includes at least one receiving slot 138 configured to receive insertable portion 136 to form a mechanical joint 139 between stator base 124 and stator tooth 132. As used herein, the term "mechanical joint" is meant to describe a portion of a machine where one mechanical part is connected to another. Specifically, a mechanical joint is formed by joining metal parts through a positive-holding mechanical assembly. As such, insertable portion 136 and receiving slot 138 hold tooth assembly 130 and stator base 124 together without the need to over-mold stator assembly 112 with resin, thus reducing the cost and increasing the efficiency of motor 108.

More specifically, in the exemplary embodiment, mechanical joint 139 is an interference fit between stator base 124 and stator tooth 132 where the external dimension of one part slightly exceeds the internal dimension of the part into which it has to fit. For example, as shown in FIGS. 4 and 5, insertable portion 136 includes a first taper angle $\alpha$ and receiving slot 138 includes a second taper angle $\beta$ that is greater than first taper angle $\alpha$ to form an interference fit between insertable portion 136 and receiving slot 138. Taper angles $\alpha$ and $\beta$ result a residual preload of insertable portion 136 and receiving slot 138 that secures mechanical joint 139 Furthermore, in the exemplary embodiment, insertable portion 136 includes an end 137 having a radius R that is substantially similar to a radius R of receiving slot 138. Alternatively, insertable portion 136 and receiving slot 138 include any shape and configuration that facilitates operation of stator assembly 112 as described herein.

In the exemplary embodiment, each stator base 124 includes a plurality of receiving slots 138 and a plurality of relief slots 142 that correspond to a respective receiving slot 138. Each relief slot 142 is formed in stator base 124 proximate a corresponding receiving slot 138. Furthermore, stator base 124 includes a post 144 positioned between corresponding relief slot 142 and receiving slot 138. A substantially similar post 144 is positioned on an opposite side of each receiving slot 138 from the corresponding relief slot 142. In operation, as insertable portion 136 of stator tooth 132 is inserted into receiving slot 138, posts 144 will slightly deform to account for the first taper angle $\alpha$ of insertable portion 136, which will result in a similar deformation of relief slot 142. As such, the retention forces on both sides of insertable portion 136 are equal and tooth assembly 130 maintains an orientation perpendicular to stator base 124 and parallel to axis 120.

As shown in FIGS. 3 and 4, tooth tip 134 and stator tooth 132 are integrally formed as a unitary component. In the exemplary embodiment, tooth assembly 130, having tooth tip 134 and stator tooth 132, is fabricated from a plurality of stacked laminated sheets. Such a construction simplifies the manufacturing process and enables tooth assembly 130 to be produced quickly and efficiently. Stator tooth 132 has the substantially same width from an inner edge to an outer edge. This enables the laminated sheets that make tooth assembly 130 to be substantially identical, which lowers manufacturing costs. Similarly, stator base 124 is also formed from a plurality of stacked laminated sheets. More specifically, each laminated sheet of tooth assembly 130 and stator base 124 includes a pair of lamination interlocks 140 that facilitate coupling multiple laminated sheets together to form tooth assembly 130 or stator base 124 having a desired width. Lamination interlocks 140 are formed as a dimple on one side of tooth assembly 130 and stator base 124 and as a projection on the opposing side. As such, the projection of one interlock 140 of a first sheet fits into the dimple of another interlock 140 on an adjacent sheet.

Stator assembly 112 also includes a plurality of bobbins 146 coupled to stator base 124. As best shown in FIG. 3, bobbins 146 are coupled to a control board 148 by a pin 150. In the exemplary embodiment, control board 148 is a printed circuit board (PCB), and each bobbin 146 is coupled to control board 148 using an insulation displacement terminal (not shown) designed for directly soldering into control board 148. Alternatively, any other suitable connector may be used that enables the plurality of bobbins 146 to be coupled to control board 148. In the exemplary embodiment, control board 148 includes a wiring connector (not shown) for directly connecting control board 148 to a motor control board (not shown). In an alternative embodiment, control board 148 is incorporated within a motor control board, thereby eliminating redundant mounting and connectors.

Figure 8:
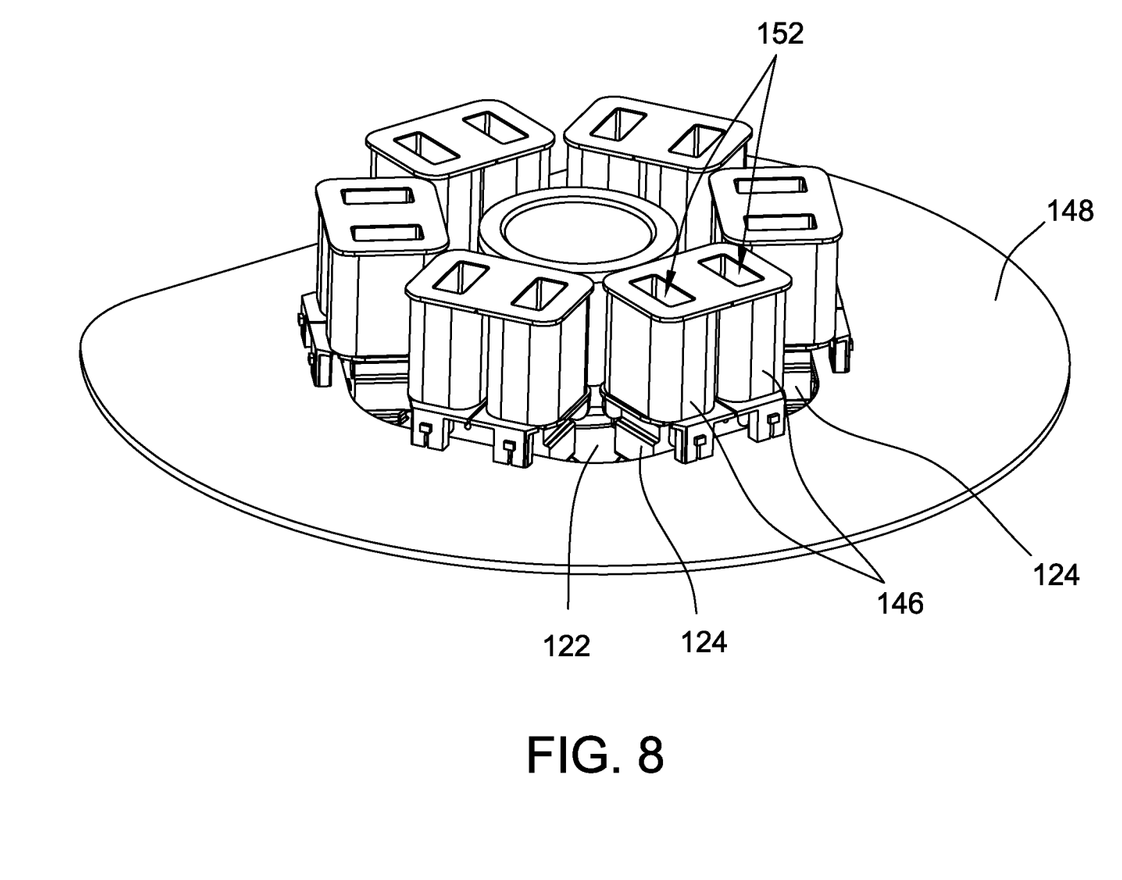
FIG. 8 is a perspective view of a partially assembled stator assembly shown in FIG. 3 illustrating a plurality of stator bases shown in FIG. 5 coupled to the motor frame shown in FIG. 6 and an plurality of bobbins.
Figure 9:
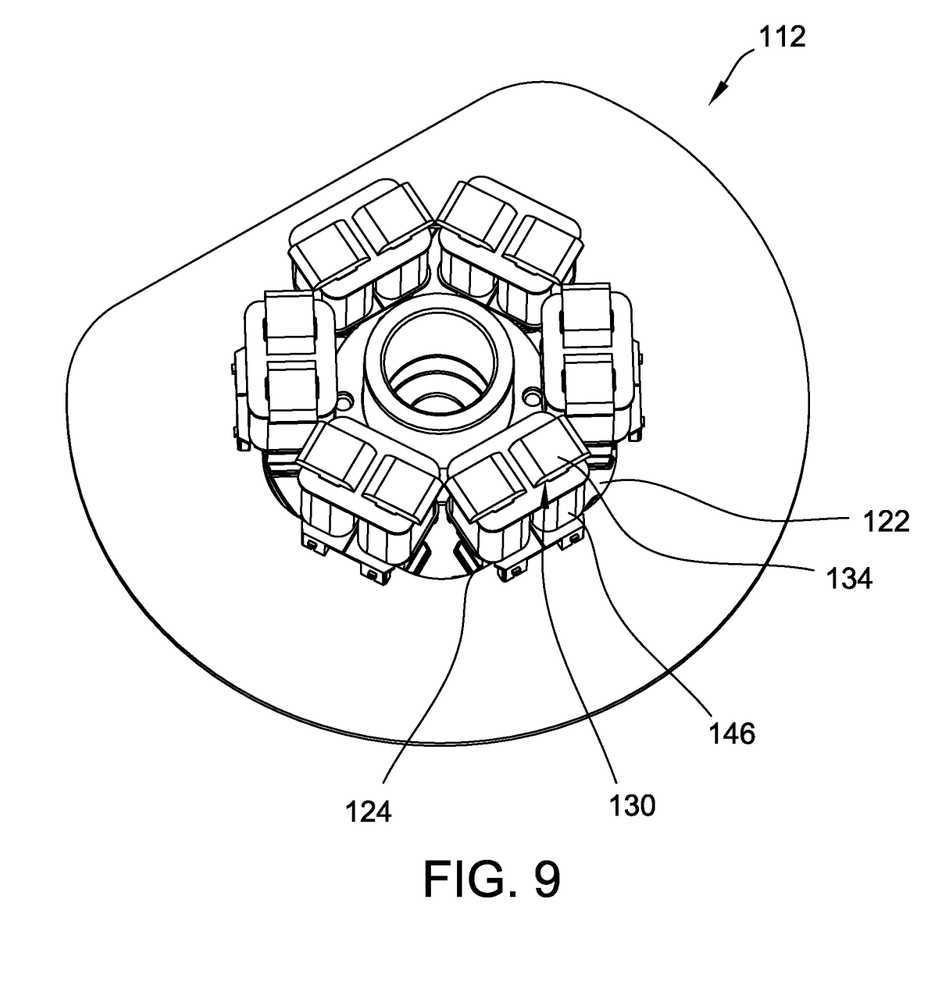
FIG. 9 is a perspective view of a partially assembled stator assembly shown in FIG. 3 illustrating a plurality of tooth assemblies shown in FIG. 4 inserted into the plurality of bobbins.

Each bobbin 146 includes an opening 152 that closely conforms to an external shape of stator tooth 132. As described herein, stator tooth 132 is configured to be inserted into a first end 154 of opening 152 and to exit a second end 156 of opening before being coupled to receiving slot 138. Stator assembly 112 may include one bobbin 146 for every tooth 132 or one bobbin 148 positioned on every other tooth 132. Each bobbin 146 also includes an electrical winding 158 that includes a plurality of coils that are wound around a respective bobbin 146, which electrically isolates the coils of winding 158 from stator tooth 132 and tooth tip 134.

Figure 10:
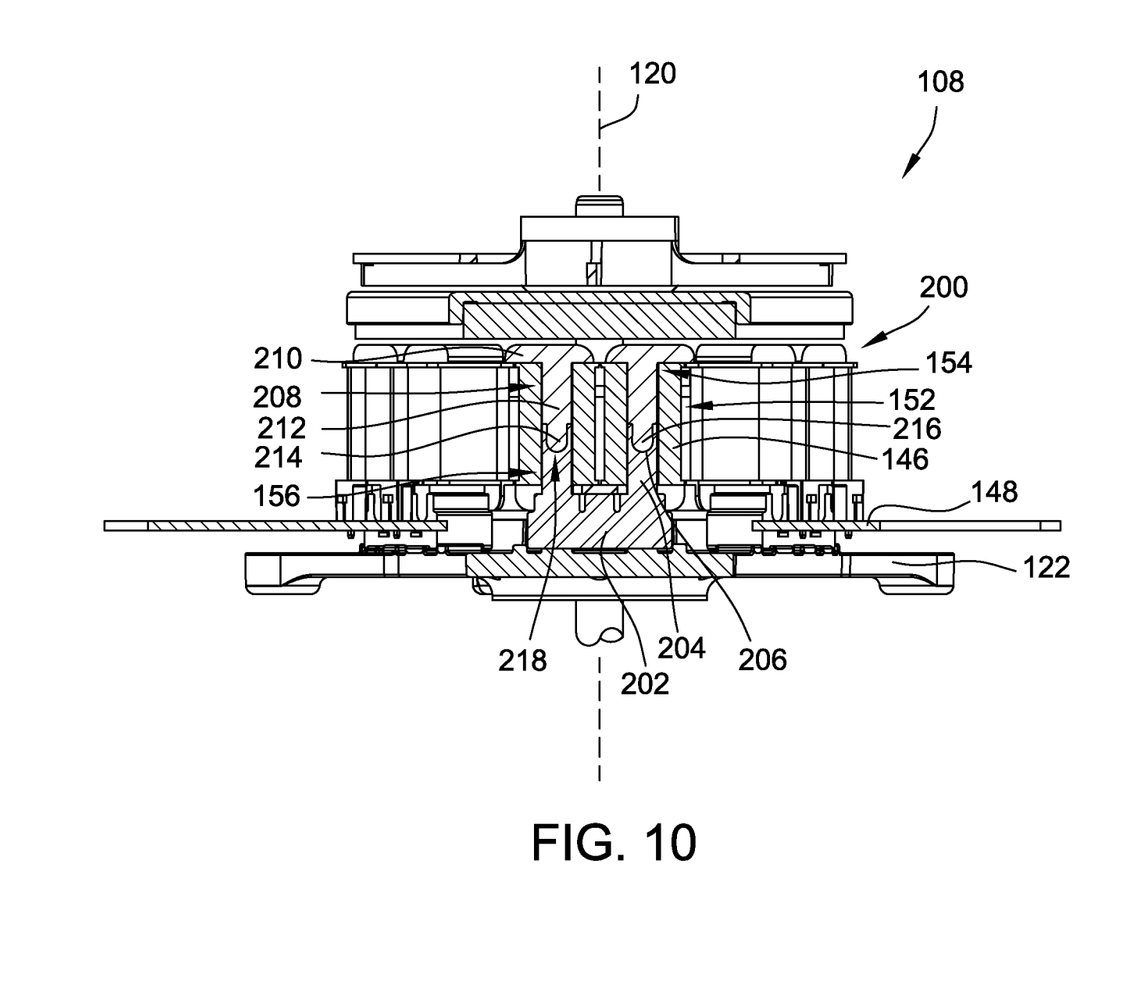
FIG. 10 is an enlarged view of the blower assembly shown in FIG. 2 illustrating an alternative stator assembly including alternative tooth assemblies and stator bases.

An exemplary method of assembling axial flux motor 108 is described herein. The method includes coupling at least one stator base 124 to motor frame 122, wherein stator base 124 includes receiving slot 138. The method also includes coupling tooth tip 134 to stator tooth 132, wherein stator tooth 132 includes insertable portion 136. More specifically, coupling tooth tip 134 to stator tooth 132 includes integrally forming tooth tip 134 and stator tooth 132 as a unitary component from a stamped lamination sheet. The method also includes coupling at least one bobbin 146 to the stator base 124 and inserting stator tooth 132 through opening 152 in bobbin 146. Insertable portion 136 of stator tooth 132 is then inserted into receiving slot 138 of stator base 124 to form mechanical joint 140 therebetween. In some embodiments, the inserting step includes inserting the insertable portion 214 into receiving slot 206 formed in an extension portion 204 of stator base 202 such that mechanical joint 218 is positioned within opening 152 of bobbin 146.

FIG. 10 is an enlarged view of blower assembly 100 illustrating an alternative stator assembly 200. Stator assembly 200 includes a plurality of stator bases 202 that each include a pair of extension portions 204 extending from stator base 202 in a direction substantially parallel to axis 120. As shown in FIG. 10, extension portion 204 includes a receiving slot 206 similar to receiving slot 138. Furthermore, stator assembly 200 includes an alternative tooth assembly 208 for use with stator bases 202. Tooth assembly 208 includes a tooth tip 210 similar to tooth tip 134 and a stator tooth 212 that extends a shorter axial length that stator tooth 132. Stator tooth 212 includes an insertable portion 214 at its distal end 216 that is substantially similar to insertable portion 136. In such a configuration, stator bases 202 are coupled to motor frame 122 and bobbins 146 are coupled to stator base 202 such that extension portion 204 extends into second end 156 of opening 152. Stator tooth 212 is then inserted into first end 154 of opening 152 until insertable portion 214 mates with receiving slot 206. As such, insertable portion 214 and receiving slot 206 form a mechanical joint 218 within opening 152 of bobbin 146, rather than in stator base 124 of stator assembly 112.

Described herein are exemplary methods and systems for axial flux electric motors. The axial flux motor includes a multiphase stator having substantially similar stator bases and substantially similar tooth assemblies made from economical laminations, which enables a modular construction. The stator bases include a receiving slot that mates with an insertable portion of the tooth assembly to form a mechanical joint therebetween. The mechanical joint holds the tooth assembly and the stator base together without the need to over-mold the stator assembly with resin, thus reducing the cost and increasing the efficiency of the motor. Furthermore, the tooth assemblies include tooth tips that reduce noise by reducing the harmonic content of the back electromagnetic field (EMF) and cogging torque. Accordingly, a lower-cost, axial flux motor is described herein that provides quicker production with a positive impact on efficiency and performance.

Exemplary embodiments of the axial flux electric machine assembly are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator assembly for use in an axial flux electric motor, said stator assembly comprising:
   at least one tooth tip;
   at least one stator tooth coupled to said at least one tooth tip, wherein said at least one stator tooth comprises an insertable portion;
   at least one stator base comprising:
      at least one receiving slot configured to receive said insertable portion to form a mechanical joint between said at least one stator base and said at least one stator tooth,
      a base mounting mechanism;
      at least one relief slot formed proximate said at least one receiving slot; and
      at least one post defined between said relief slot and said receiving slot, wherein said at least one post comprises a first side and an opposing second side obliquely oriented with respect to said first side;
      an extension portion extending from said at least one stator base, said extension portion comprising said at least one receiving slot; and
   a motor frame comprising at least one frame mounting mechanism configured to couple to said base mounting mechanism to couple said at least one stator base to said motor frame.

2. The stator assembly in accordance with claim 1, wherein said insertable portion comprises a first taper angle and wherein said at least one receiving slot comprises a second taper angle greater than the first taper angle to form an interference fit.

3. The stator assembly in accordance with claim 1, wherein said at least one tooth tip and said at least one stator tooth are integrally formed as a unitary component.

4. The stator assembly in accordance with claim 1, further comprising a bobbin coupled to said at least one stator base, wherein said extension portion extends into an opening defined in said bobbin, and wherein said at least one stator tooth is configured for insertion into said opening such that said mechanical joint is positioned within said opening.

5. The stator assembly in accordance with claim 1, wherein said at least one stator base comprises a ring-shaped stator base comprising a plurality of said receiving slots.

6. The stator assembly in accordance with claim 1, wherein said at least one stator base comprises a plurality of circumferentially-spaced stator bases.

7. An axial flux electric motor comprising:
   a rotor assembly; and
   a stator assembly coupled to said rotor assembly to define an axial gap therebetween, wherein said stator assembly comprises:
      at least one tooth assembly comprising a tip portion and a tooth portion integrally formed with said tip portion, wherein said tooth portion comprises an insertable portion; and
      a plurality of stator bases, wherein each stator base comprises:
         at least one receiving slot configured to receive said insertable portion to form a mechanical joint between said at least one stator base and said at least one tooth assembly,
         a base mounting mechanism; and
         at least one relief slot formed proximate said at least one receiving slot; and
         at least one post defined between said relief slot and said receiving slot, wherein said at least one post comprises a first side and an opposing second side obliquely oriented with respect to said first side; and a motor frame comprising at least one frame mounting mechanism configured to couple to said base mounting mechanism to couple said at least one stator base to said motor frame, wherein said plurality of stator bases are circumferentially-spaced about said motor frame.

8. The axial flux electric motor in accordance with claim 7, wherein said at least one stator base comprises an extension portion extending from said at least one stator base, said extension portion comprising said at least one receiving slot.

9. The axial flux electric motor in accordance with claim 8, further comprising a bobbin coupled to said at least one stator base, wherein said extension portion extends into an opening defined in said bobbin, and wherein said tooth portion is configured for insertion into said opening such that said mechanical joint is positioned within said opening.

10. The axial flux electric motor in accordance with claim 7, wherein said at least one tooth assembly comprises a plurality of stacked laminated sheets.

11. The axial flux electric motor in accordance with claim 7, wherein said at least one stator base comprises a ring-shaped stator base comprising a plurality of said receiving slots.

12. A method of assembling an axial flux electric motor, said method comprising:
coupling at least one stator base to a motor frame, wherein the at least one stator base includes:
at least one receiving slot,
a base mounting mechanism, wherein coupling the at least one stator base comprises coupling the base mounting mechanism to a frame mounting mechanism of the motor frame,
at least one relief slot formed proximate the at least one receiving slot; and
at least one post defined between the at least one relief slot and the receiving slot, wherein the at least one post includes a first side and an opposing second side obliquely oriented with respect to the first side; and
coupling a tooth tip to a stator tooth, wherein the stator tooth includes an insertable portion;
coupling at least one bobbin to the at least one stator base; and
inserting the insertable portion of the stator tooth through an opening in the at least one bobbin and into the at least one receiving slot of the stator base to form a mechanical joint, wherein the post is configured to deform upon insertion of the insertable portion.

13. The method of claim 12, wherein coupling the tooth tip to the stator tooth comprises integrally forming the tooth tip and the stator tooth as a unitary component.

14. The method of claim 12, wherein inserting the insertable portion comprises inserting the insertable portion into the at least one receiving slot formed in an extension portion of the at least one stator base such that the mechanical joint is positioned within the opening of the at least one bobbin.

15. The method of claim 14, wherein coupling the at least one stator base to the motor frame comprises coupling a ring-shaped stator base to the motor frame.

16. An axial flux electric motor comprising:
a rotor assembly; and
a stator assembly coupled to said rotor assembly to define an axial gap therebetween, wherein said stator assembly comprises:
at least one tooth assembly comprising a tip portion and a tooth portion integrally formed with said tip portion, wherein said tooth portion comprises an insertable portion, wherein said at least one tooth assembly comprises a plurality of stacked laminated sheets; and
at least one stator base comprising:
at least one receiving slot configured to receive said insertable portion to form a mechanical joint between said at least one stator base and said at least one tooth assembly,
a base mounting mechanism; and
at least one relief slot formed proximate said at least one receiving slot; and
at least one post defined between said relief slot and said receiving slot, wherein said at least one post comprises a first side and an opposing second side obliquely oriented with respect to said first side; and
a motor frame comprising at least one frame mounting mechanism configured to couple to said base mounting mechanism to couple said at least one stator base to said motor frame.

* * * * *